Feb. 12, 1963   C. VAN DER LELY ETAL   3,077,351
VEHICULAR SPREADER
Original Filed March 30, 1954
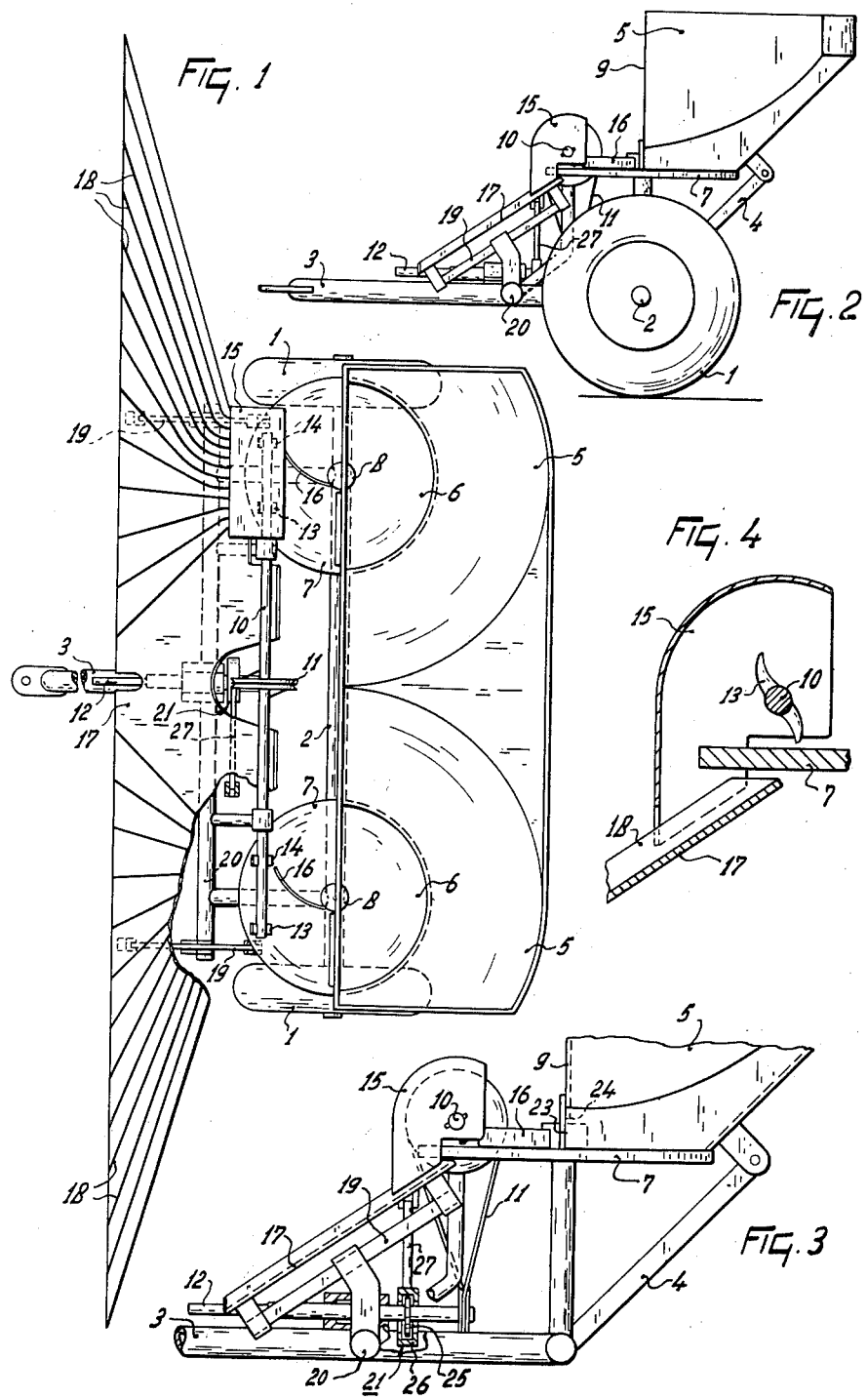

3,077,351
VEHICULAR SPREADER
Cornelis van der Lely, Zug, Switzerland, and Ary van der Lely, Maasland, Netherlands, assignors to C. van der Lely N.V., Maasland, Netherlands, a Dutch limited company
Original application Mar. 30, 1954, Ser. No. 419,825, now Patent No. 2,980,430, dated Apr. 18, 1961. Divided and this application Mar. 30, 1960, Ser. No. 18,616
Claims priority, application Netherlands Apr. 2, 1953
8 Claims. (Cl. 275—7)

This invention is a division of our application Serial No. 419,825, filed March 30, 1954, now Patent No. 2,980,430, granted April 18, 1961, and relates to a vehicular device for spreading strewable material over a strip-like area of ground during ground traversing movement of the device, the device being of the type comprising a supporting frame and at least one container for the material to be strewn mounted on said frame and having at least one outlet opening.

It is an object of the present invention to provide a simple device of the above indicated kind with which an even distribution of the material can be obtained. According to the invention this is attained by the fact that beneath said outlet opening a disc is located which is rotatable on a substantially vertical axis at a low speed to transport the material supplied through said outlet opening to a spreading member being located beneath said disk, said spreading member being coupled to driving means and throwing out the material received from the disc over said strip-like area.

A further object of the invention is to provide a guide member above the part of the said disk located outside of the container, which guide member guides the material in the direction of the periphery of the disk, owing to which a good supply of the material to the spreading member is insured.

A particularly favorable embodiment of the device is obtained when according to the invention the spreading member is provided with diverging gutters, the lower ends of which cover the entire width of the said strip-like area, whereas the upper ends are narrower and are located near the said disk.

Further objects, features and details of the invention will appear from the following description with reference to the accompanying drawings, in which:

FIG. 1 is a plan view of a device according to the invention,

FIG. 2 is a side view of said device,

FIG. 3 is, on an enlarged scale, a side view of the device according to FIG. 1, in which view the running wheels have been omitted and some parts are shown in section, and FIG. 4 shows a detail of a portion of FIG. 3 partly in section and enlarged.

The device shown in the drawing is intended to be connected to a tractor by means of a draw arm. Said device is supported by two wheels 1 mounted on an axle 2. To the axle 2 are connected the draw arm 3 and supporting members, such as the bar 4, for a container 5. This container 5 is provided at its lower end with two semi-circular openings 6 situated in the same horizontal plane. In order to secure an unobstructed flow of the material towards said openings, several wall parts of the container are shaped conically. The semi-circular openings are closed by horizontal disks 7 rotatable on vertical axles 8. Directly over the axles 8 is located the vertical front wall 9 of the container 5 so that only about half of each disk 7 is located under the container 5, which half of each disk constitutes the bottom of the container, the other half of each disk constituting a supporting member for the material flowing from the container. When the device is travelling and suitable transmission means between the wheels 2 and the disks 7 are put into operation, the disks 7 will rotate, viewed from above, slowly in clockwise direction, thereby carrying along with them material from the container through a narrow slit-shaped outlet opening 23 to the outside, said slit being left between the lower edge 24 of the wall 9 and the disks 7. Over the foremost halves of the disks 7, which halves constitute supporting members for the material, a horizontal shaft 10 is mounted in bearings rigidly connected to the bars 20, the movement of said shaft 10 being derived by means of a rope or endless member 11 from a shaft 12 coupled with the motor (not shown) of the tractor. The shaft 10 rotates at a relatively high speed. During this rotation shovel-like throwing members 13 and 14 fixed upon the shaft 10 move from their lower position forwards, thereby throwing material transported by the disks from the outlet opening within the reach of the shovel-like members forwardly and upwardly into caps 15. The shovels 13 will throw the material which upon leaving the container is situated farthest from the axis of the disk in question. The material which is nearer to said axis is guided by curved guiding members 16 to the shovels 14. The guiding member 16 is curved in the direction of rotation of the disk 7 reckoned from said axis.

Under the portions of the caps 15 which extend beyond the edge of the disks 7 is located a spreading member in the form of a forwardly inclined plate 17, the horizontal upper edge of which is located beneath said disks and upon which diverging gutters 18 are formed having their lower ends situated on a horizontal straight line. The lower ends of the gutters 18 cover the entire width of the area to be supplied, whereas the upper ends are narrower and constitute two groups having the width of a cap 13 and being located exactly under said caps, by which the gutters are equally supplied with material. The plate 17, which is made as light in weight as possible, is supported by two leaf springs 19 the middles of which are connected to the ends of a horizontal bar 20 fixed to the draw arm 3. The shaft 12 drives a shaking device 21 comprising an eccentric disk 25 and a ring 26 connected to a driving rod 27, by means of which the plate 17 is caused to perform a reciprocating motion transversely to the direction of travel. When suitably adjusted, this device insures a particular uniform distribution of the material over the area of the ground.

What we claim is:

1. A vehicular device for spreading strewable material over a strip-like area of the ground during ground traversing movement of the device, comprising a supporting frame, at least one container for the material to be strewn mounted on said frame and having at least one outlet opening, a disk located in part beneath said outlet opening and constituting a bottom therefor such that material in said container is fully supported on said disk, said disk being rotatable on a substantially vertical axis, means for rotating said disk about said axis at a low speed to transport material on said disk in undisturbed manner externally of said container, a spreading member located beneath said disk to receive the material from said disk, said spreading member and said disk being spaced from one another in a direction parallel to the direction of travel, a guide member above a part of said disk and located outside the container, said guide member being positioned relative to said disk to guide material thereon towards the periphery of the disk, the material at the periphery of the disk being transferred onto the spreading member, the device further comprising driving means coupled to said spreading member whereby the latter throws material received from the disk over said strip-like area.

2. A device as defined in claim 1, wherein the guide member extends from the axis of the disc along a curved path to the periphery of the disc and is curved from the said axis in the direction of rotation of the disc.

3. A device as defined in claim 1, wherein the disc has a periphery, the device comprising a disc, a throwing member mounted adjacent the periphery of the disc for throwing the material from the disc onto the spreading member.

4. A device as defined in claim 3, comprising a horizontal axle, said throwing member being mounted on said horizontal axle.

5. A device as defined in claim 3, comprising caps near said throwing member, into which caps the material is thrown by said throwing member.

6. A vehicular device for spreading strewable material over a strip-like area of the ground during ground traversing movement of the device, comprising a supporting frame, at least one container on said frame for the material to be strewn and having at least one outlet opening, a disk located beneath said outlet opening, said disc being rotatable on a substantially vertical axis at a low speed to transport material supplied through said outlet opening, a spreading member located beneath said disk to receive material therefrom, said spreading member including diverging gutters having lower ends which cover the entire width of the said striplike area, said gutters having upper ends which are narrower and are located near the said disk, and driving means, said spreading member being coupled to said driving means and being driven thereby to throw material received from the disk over said striplike area.

7. A device as defined in claim 6, wherein said driving means includes a shaking device and means coupling said spreading member to said shaking device for causing the spreading member to perform a reciprocating movement transversely to the direction of travel.

8. A device for spreading strewable material over a strip-like area during ground traversing movement, said device comprising a supporting frame, at least one container on said frame and adapted for accommodating the material to be strewn, said container having at least one outlet opening, a disk located in part beneath said outlet opening to constitute a bottom therefor such that material in said container is freely supported on said disk, said disk being rotatable on a substantially vertical axis, means for rotating said disk about said axis for transporting the material thereon externally of the container, a spreading member located beneath said disk to receive said material therefrom, driving means coupled to said spreading member which is driven thereby to throw material received from the disk over said striplike area and a guide member associated with said disk and extending from the axis of the disk along a curved path to the periphery of the disk and being curved from the said axis in the direction of rotation of said disk.

References Cited in the file of this patent

UNITED STATES PATENTS

| | | |
|---|---|---|
| 1,556,922 | Fentiman | Oct. 13, 1925 |
| 1,558,282 | Prang | Oct. 20, 1925 |
| 2,863,669 | Allersma | Dec. 9, 1958 |

FOREIGN PATENTS

| | | |
|---|---|---|
| 73,931 | Austria | Oct. 25, 1917 |
| 899,872 | France | Sept. 4, 1944 |